United States Patent Office 2,776,240
Patented Jan. 1, 1957

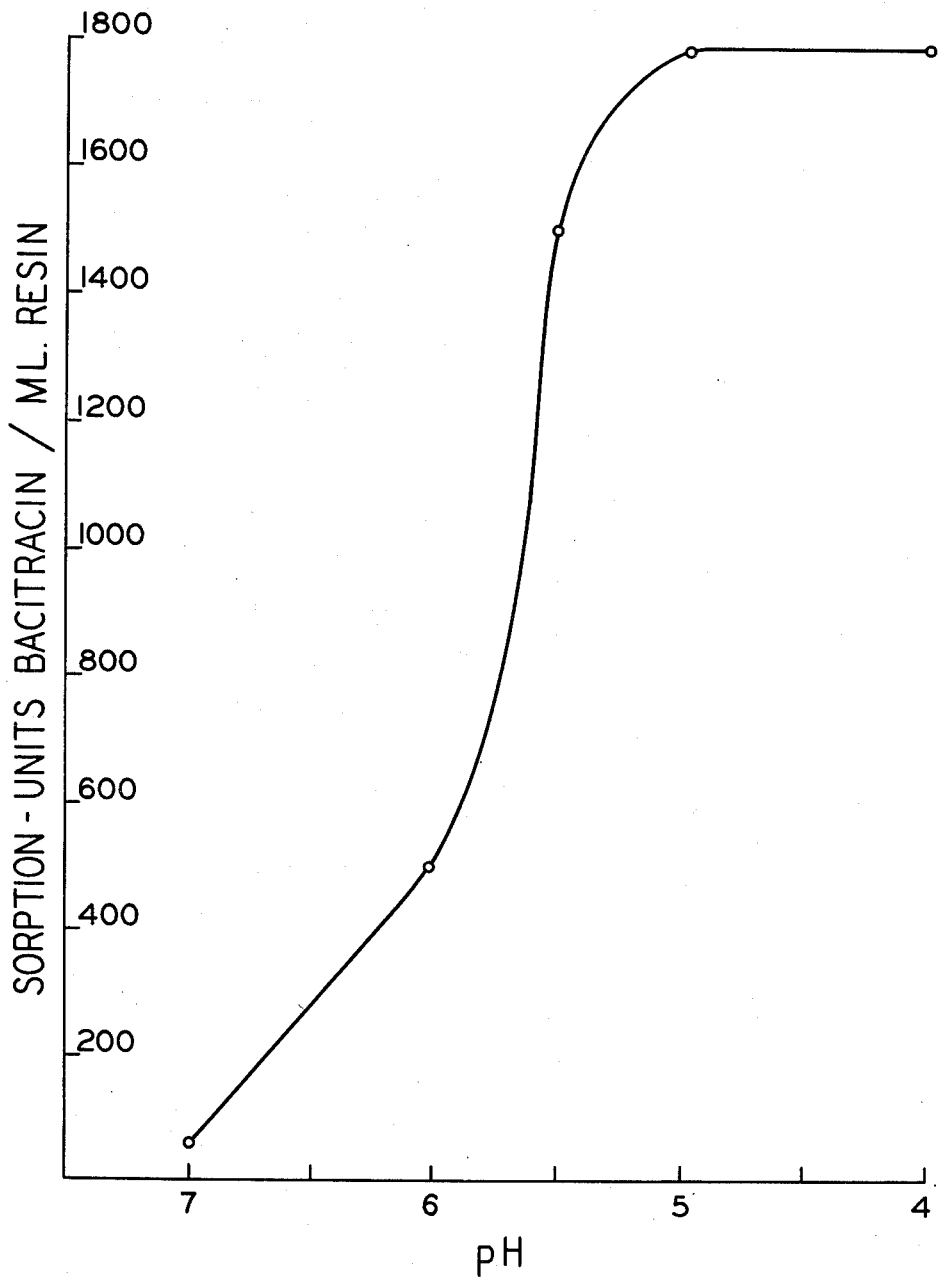

2,776,240

RECOVERY AND PURIFICATION OF BACITRACIN

Robert W. Shortridge, Kansas City, Mo., assignor to Commercial Solvents Corporation, Terre Haute, Ind., a corporation of Maryland Application September 10, 1954, Serial No. 455,245

4 Claims. (Cl. 167—65)

This invention relates to the recovery and purification of bacitracin. More particularly, it relates to a process for recovering the antibiotic in a purified form from culture liquors in which it is produced by ion-exchange sorption and elution as more particularly described hereinafter.

It has been known that certain strains of bacteria of the *Bacillus subtilis* group will synthesize bacitracin when propagated in the presence of oxygen on various liquid nutrient media. The first mention of bacitracin in the literature was an article by B. A. Johnson, H. Ankar and F. L. Meleney in "Science," vol. 102, pages 376–377, entitled "Bacitracin: A new antibiotic produced by a member of the *Bacillus subtilis* group." U. S. P. No. 2,457,887, granted January 4, 1949, to John T. Goorley, describes the production of bacitracin by the incubation of a soybean meal medium and a method for recovery of the antibiotic. According to the disclosure of that patent, bacitracin is first separated from the fermented medium in which it is produced by adsorption on an adsorbent such as activated alumina or activated carbon. After separating the adsorbed material from the fermentation medium bacitracin is eluted from the adsorbent by treatment with a mixture of a dilute aqueous solution of an acid such as hydrochloric acid and an organic solvent that is inert with respect to bacitracin, such as butanol or other water-insoluble aliphatic alcohols. After neutralization of the acid solution the butanol or other similar solution is next treated with an adsorbent to remove impurities, followed by extraction of the liquid with water and a water immiscible organic solvent, such as chloroform, which decreases the solubility of bacitracin in butanol so that the bacitracin goes into the water phase which may then be concentrated or carried to dryness.

An improved process for the recovery of bacitracin is described in U. S. Patent 2,609,324, by Murray Senkus and Peter Markunas. In accordance with the process therein described, a water-immiscible aliphatic alcohol solution of bacitracin is first prepared by direct extraction at pH 7.0. The alcohol solution containing the bacitracin is then mixed with water and the pH of the resulting solution is adjusted to a pH less than 4.0 by addition of an acid. The bacitracin is thus recovered in a water layer which forms.

U. S. Patent 2,498,165 describes and claims a method for recovering bacitracin whereby the partially purified material is precipitated by the addition of Reinecke's salt, phosphotungstic acid, phosphomolybdic acid, molybdic acid, picric acid or ammonium rhodanilate.

The above described and all other previously suggested processes for the recovery and purification of bacitracin have been subject to numerous disadvantages. For example, low yields of relatively impure bacitracin were obtained. I have now discovered that overall yields of bacitracin can be very materially increased and the recovery and purification procedure shortened and simplified by following my improved process whereby bacitracin is sorbed by an ion-exchange resin and subsequently eluted therefrom.

In carrying out my improved process for the recovery and purification of bacitracin I prefer to prepare the fermentation liquor by filtering to remove suspended solids, then adjusting the pH to about 5 with a weak acid and again filtering to render sparkling. The sparkling fermentation liquor is then passed through a column of a suitable ion-exchange resin buffered at about pH 5.0 whereby the bacitracin is sorbed by the resin. When the bacitracin has been sorbed by the resin to such an extent that the capacity of the resin has been almost exhausted, as evidenced by a sharp "break through" or increase in bacitracin content of the spent liquor, the bacitracin is then eluted by passing a suitable eluting agent through the column and the purified bacitracin is recovered from the eluate. The details of this operation are set out below.

During the course of the experimentation which led to the present invention innumerable resins were tested for their ability to sorb bacitracin from fermentation liquors. After a very great number of unsuccessful experiments I discovered that bacitracin can be sorbed, under specified conditions, by certain ion-exchange resins whose active groups are carboxyl groups. The class of ion-exchange resins which are operative in the process of my invention can be generically described as carboxylic acid type, cation-exchange resins. The composition of the resin matrix to which the active groups are attached is relatively unimportant so long as the matrix is such that the resin is rendered insoluble in ordinary solvents, but is not rendered so rigid that swelling to permit the entrance of solvent and solute molecules cannot take place.

The carboxylic acid type cation-exchange resin can be used in the free acid form or preferably it can be converted into the ammonium form. The latter can be accomplished by treatment with ammonia followed by backwashing to reclassify and to remove excess ammonia. The resin bed is next buffered to the proper pH. Any buffering system that will give a pH between 4 and 5.7 will be operative in buffering the resin. Since the binding strength between resin anion and buffer cation increases with the valence of the cation, it would be expected that polyvalent cations would be held more firmly by the resin and therefore be replaced by bacitracin cations with more difficulty. This effect appears as a decreased capacity for bacitracin in a column buffered with a solution containing polyvalent cations. For this reason, I prefer to use a monovalent cation for buffering the column. Further, I prefer an ammonium buffer because the resin to be buffered is preferably in the ammonium form. There is in this case no contamination of the effluent buffer solution with extraneous ions, and it may therefore be used again after the addition of acid and water to restore the original pH and specific gravity.

The anion component of the buffer solution makes no difference as long as it has no deleterious effect on the bacitracin or the resin. Practically, a relatively weak acid is desirable for ease of preparation of a buffer solution at a pH below 5.7 and for ease of maintenance of that solution at the desired acidic pH. Among the buffers which can be used in my process are included the ammonium, alkali metal and alkaline earth metal acetates, formates, chlorides, etc. Particularly good results are obtained when sodium or ammonium acetate solutions, adjusted to pH 5 with acetic acid, are used.

Sorption of bacitracin occurs to the extent of about 1800 units per ml. of resin at pH 4.0 and pH 5.0, 1500 units at pH 5.5, 500 units at pH 6.0, and 60 units at pH 7.0. On the basis of amounts sorbed, therefore, there is no choice between pH 4.0 and 5.0. On the other hand, much more colored material and foam-forming substances appear in the sorption effluent at pH 5.0, thus indicating greater purity of the sorbed bacitracin at that pH, which is therefore considered optimum. The above sorption data are shown in the accompanying drawing, the figure of which is a graph of these data with sorption plotted as the ordinate against pH as the abscissa. It can be seen that the curve passes through a point where the value of its tangent becomes a maximum. This point is at pH 5.7 and this is the critical upper pH limit. Thus maximum sorption occurs in the critical pH range of from 4.0 to 5.7. Sorptions obtained at pH values above 5.7 are so low as to make these values inoperative from the practical standpoint.

For ease of operation it is preferred that the fermentation liquors be filtered to remove any suspended solids before passage through the resin column. This filtration step can be carried out in any known manner, with or without the addition of a so-called "filter aid." After filtration, and immediately before passage through the resin bed, the pH of the filtered liquor should be adjusted to 4–5.7 by the addition of an acid. Except for the filtration and pH adjustment, no other treatment or prior purification of the fermentation liquors is required before passage of the liquors through the resin bed.

The ratio of resin volume to fermentation liquor being treated is not a critical feature of my invention but should preferably be such that about one ml. of resin is used for each 1500 units of bacitracin in the fermentation liquor being treated. Once the capacity of the resin has been reached, i. e. when about 1500 units of bacitracin have been sorbed for each ml. of resin as evidenced by a sharp rise in bacitracin content of the spent liquor, it is necessary to desorb the bacitracin therefrom before treatment of additional liquors.

The rate at which the fermentation liquor is fed through the resin bed is not a critical feature of my invention and can vary with size and shape of resin bed, concentration of bacitracin in the liquor, etc. Sorption has been carried out at rates as high as 0.25 ml. of liquor per minute per ml. of resin with no diminution in capacity. Sorption will occur at higher flow rates, but with slightly less capacity. Any flow rates lower than the above can, of course, be used. I prefer to operate with flow rates between about 0.1 to 0.15 ml. per minute per ml. of resin.

A wide range of eluting agents can be used for desorption of the bacitracin from the exchange resin: (1) aqueous acids, which are effective by exchange of bacitracin from the resin for hydrogen ions, (2) salt solutions, which exchange bacitracin for metal ions, and (3) basic solutions, which not only exchange bacitracin for metal ions, but also convert the eluted bacitracin to the anion in which form it is not sorbed at all on the resin. Basic solutions are preferred for this reason, as only in this case is the desorption irreversible. Practically, strong bases should not be used because of the instability of bacitracin therein. Weak bases are preferred with ammonia water being the most desirable. Also suitable are primary, secondary and tertiary aliphatic, alicyclic and aromatic amines. Any ammonia solution with a pH of 10 or above can be used. Concentrations above 2% cause excessive column heating and bacitracin destruction. Concentrations below 0.5% give too slow elution and too dilute eluates. The optimum concentration for the eluting agent is about 1%.

The eluate from the desorption step contains the purified bacitracin and can be concentrated and utilized as such. If desired this eluate can be subjected to additional purification steps such as those described in the patents and applications referred to above, or by subsequent treatment with ion-exchange resins whose active groups are strongly basic.

A better understanding of the nature and concepts of my invention can be had by reference to the following examples, which are presented for purpose of illustration only and are in no way intended to limit the invention:

EXAMPLE I

A 40 mm. inside diameter glass tube was closed at the lower end with a stop cock and a few cm. of 10-mesh acid-washed gravel was added thereto to act as a support for the resin. The tube was then filled with "Amberlite IRC-50" (a carboxylic type, cation-exchange resin sold by the Rohm & Haas Company and described in Patent No. 2,579,974). After backwashing to remove fines and to classify the remainder of the resin, the resin had a volume of 265 ml. The resin was then converted to the ammonium form by treatment downflow with 565 ml. of 4% ammonia. It was then backwashed to reclassify and to remove excess ammonia, and treated downflow with 2570 ml. of 1 M sodium acetate solution adjusted to pH 5.0 with acetic acid. At the end of this operation the effluent had a pH of 5.0. After rinsing and backwashing with water the resin bed was ready for sorption.

Five thousand ml. of plant fermentation liquor, which had been filtered and stored overnight, was adjusted to pH 5.0 with sulfuric acid. The fermentation liquor ready for sorption assayed 46 units per ml. and 5,000 ml., containing 230,000 units, was passed through the column at about 15–20 ml. per minute. After passage of the liquor, the column was washed downflow with 1,000 ml. of water. Assay of the combined eluate and washings indicated leakage of 780 units. The bacitracin was eluted from the resin with 4% ammonia at 11.5 ml. per minute. Successive 50-ml. fractions of eluate were collected, their pH measured, and they were assayed. The results are tabulated in Table I below. The total recovery of bacitracin, in a solution of concentration of 300 units per ml., was 180,000 units (77%).

Some operational difficulty was experienced due to a faint cloudiness, which appeared in the liquor before passing through the column, collecting at the top of the resin bed. From this experiment it was determined that it is desirable to filter the liquor until sparkling immediately before passing through the resin bed.

It was noted during elution that column heating was excessive, and undoubtedly some bacitracin was thereby decomposed. It was determined that this difficulty could probably be overcome by using a less concentrated eluting agent.

*Table 1*

| Fraction | Volume, ml. | Total Volume, ml. | pH | Assay (u./ml.) | Units Present |
| --- | --- | --- | --- | --- | --- |
| 1 | 50 | 50 | 6.5 | 0 | 0 |
| 2 | 50 | 100 | 6.5 | 0 | 0 |
| 3 | 49 | 149 | 6.5 | 0 | 0 |
| 4 | 50 | 199 | 6.4 | 0.8 | 40 |
| 5 | 50 | 249 | 6.2 | 5.2 | 260 |
| 6 | 50 | 299 | 6.2 | 18 | 900 |
| 7 | 51 | 350 | 6.3 | 45 | 2,300 |
| 8 | 52 | 402 | 6.6 | 271 | 14,100 |
| 9 | 49 | 451 | 6.8 | 422 | 20,700 |
| 10 | 50 | 501 | 7.0 | 870 | 43,500 |
| 11 | 50 | 551 | 7.2 | 1,205 | 60,200 |
| 12 | 50 | 601 | 10.0 | 637 | 31,900 |
| 13 | 50 | 651 | 11.0 | 33 | 1,650 |
| 14 | 50 | 701 | 11.4 | 60 | 3,000 |
| 15 | 50 | 751 | 11.6 | 16 | 800 |

EXAMPLE II

Filtered fermentation liquor from plant production of bacitracin was adjusted to pH 5.0 with sulfuric acid. The liquor was clear and sparkling after this adjustment. It assayed 42 units per ml., and 5,000 ml., containing 210,000 units, was passed through the column described in Example I at a rate of 20 ml. per minute. The column was then washed with 2,000 ml. of water. The combined effluent and washings assayed zero at a ⅕ level. Elution was carried out with 2% ammonia at a rate of 14 ml. per minute. Successive 50-ml. fractions of eluate were collected, their pH measured, and they were assayed. The results are detailed in Table II below.

The total recovery of bacitracin was 187,660 units (89%).

Table II

| Fraction | Volume, ml. | Total Volume, ml. | pH | Assay (u./ml.) | Units Present |
|---|---|---|---|---|---|
| 1 | 52 | 52 | 6.4 | 0 | 0 |
| 2 | 52 | 104 | 6.2 | 0 | 0 |
| 3 | 48 | 152 | 6.3 | 0 | 0 |
| 4 | 49 | 201 | 6.3 | 0.5 | 25 |
| 5 | 49 | 250 | 6.3 | 1.4 | 70 |
| 6 | 50 | 300 | 6.3 | 3.6 | 180 |
| 7 | 50 | 350 | 6.4 | 7.7 | 385 |
| 8 | 50 | 400 | 6.5 | 22 | 1,100 |
| 9 | 50 | 450 | 6.5 | 56 | 2,800 |
| 10 | 50 | 500 | 6.6 | 114 | 5,700 |
| 11 | 50 | 440 | 6.7 | 174 | 8,700 |
| 12 | 50 | 600 | 6.8 | 334 | 16,700 |
| 13 | 50 | 650 | 6.9 | 392 | 19,600 |
| 14 | 50 | 700 | 7.0 | 472 | 23,600 |
| 15 | 50 | 750 | 7.1 | 480 | 24,000 |
| 16 | 50 | 800 | 7.4 | 485 | 24,250 |
| 17 | 50 | 850 | 7.3 | 460 | 23,000 |
| 18 | 50 | 900 | 8.2 | 396 | 19,800 |
| 19 | 50 | 950 | 10.3 | 282 | 14,100 |
| 20 | 50 | 1,000 | 10.8 | 73 | 3,650 |

EXAMPLE III

Filtered plant fermentation liquor was refiltered with 2% "Supercel" and the pH adjusted to 5.0 by the addition of acetic acid. This liquor assayed 57 units per ml., and 5,000 ml. containing 285,000 units, was run through the column at 20 ml. per minute. The column was then washed with 2,000 ml. of water. The combined effluent and washings, assayed, contained 6764 units; sorbed on the column, by difference were 278,000 units (97.5%). Elution was with 2% ammonia at 12 ml. per minute. Successive 100-ml. fractions of eluate were collected, their pH measured, and they were assayed. The results are detailed in Table III. The total recovery of bacitracin, in a solution of a concentration of 220 units per ml., was 240,000 units (86% based on bacitracin sorbed).

Table III

| Fraction | Volume, ml. | Total Volume, ml. | pH | Assay (u./ml.) | Units Present |
|---|---|---|---|---|---|
| 1 | 200 | 200 | 6.3 | 0 | 0 |
| 2 | 100 | 300 | 6.3 | 0.6 | 60 |
| 3 | 100 | 400 | 6.3 | 7.3 | 730 |
| 4 | 100 | 500 | 6.4 | 33 | 3,300 |
| 5 | 100 | 600 | 6.6 | 172 | 17,200 |
| 6 | 100 | 700 | 6.8 | 440 | 44,000 |
| 7 | 100 | 800 | 7.0 | 610 | 61,000 |
| 8 | 100 | 900 | 7.3 | 660 | 66,000 |
| 9 | 100 | 1,000 | 10.1 | 408 | 40,800 |
| 10 | 100 | 1,100 | 11.1 | 69 | 6,900 |
| 11 | 100 | 1,300 | 11.4 | 4.3 | 430 |

It is to be understood, of course, that I am not limited to the specific operating procedures set forth in the above specific examples since various modifications of the procedure set forth therein will naturally occur to those skilled in the art. I may vary my claimed invention so long as the particular process hereinbefore disclosed and covered by the appended claims is followed. The present application is a continuation-in-part of application Serial No. 182,407, filed August 30, 1950, now abandoned.

I claim:

1. A process of recovering bacitracin from fermentation liquors in which it has been produced, which comprises adjusting the pH of such a fermentation liquor to a value of from about 4 to 5.7, passing it in contact with a bed of carboxylic acid type exchange resin to cause sorption of the bacitracin on the resin, then passing a dilute aqueous solution of a weak base in contact with the bed of exchange resin in amount sufficient to elute from the bed substantially its entire content of sorbed bacitracin, and recovering the bacitracin from the eluate.

2. A process of recovering bacitracin from fermentation liquors in which it has been produced, which comprises adjusting the pH of such a fermentation liquor to a value of from about 4 to 5.7, passing it in contact with a bed of carboxylic acid type exchange resin, which has been previously buffered to a pH of from about 4 to 5.7, thereby causing sorption of the bacitracin on the resin, then passing a dilute aqueous solution of ammonia in contact with the bed of exchange resin in amount sufficient to elute from the bed substantially its entire content of sorbed bacitracin, and recovering the bacitracin from the eluate.

3. A process of recovering bacitracin from fermentation liquors in which it has been produced, which comprises adjusting the pH of such a fermentation liquor to a value of from about 4 to 5.7, passing it in contact with a bed of carboxylic acid type exchange resin, which has been previously buffered to a pH of from about 4 to 5.7, thereby causing sorption of the bacitracin on the resin, then passing a dilute aqueous solution of ammonia, having a concentration ranging from about 0.5 to 2% by weight, in contact with the bed of exchange resin in amount sufficient to elute from the bed substantially its entire content of sorbed bacitracin, and recovering the bacitracin from the eluate.

4. A process for recovering bacitracin from fermentation liquors in which it is produced which comprises converting a bed of carboxylic acid type cation exchange resin into its ammonium form, buffering it at a pH value within the range of from 4 to 5.7, adjusting the pH of such a fermentation liquor to a value within the same range, passing the liquor in contact with the resin, thereby causing sorption of the bacitracin on said resin, then passing a dilute aqueous solution of ammonia, having a concentration ranging from about 0.5 to 2% by weight, in contact with the bed of exchange resin in amount sufficient to elute from the bed substantially its entire content of sorbed bacitracin, and recovering the bacitracin from the eluate.

References Cited in the file of this patent

UNITED STATES PATENTS

| 2,505,053 | Kuehl | Apr. 25, 1950 |
| 2,528,022 | Van Dolah | Oct. 31, 1950 |
| 2,528,188 | Taylor | Oct. 31, 1950 |
| 2,582,921 | Charney | Jan. 15, 1952 |

OTHER REFERENCES

"Amberlite Ion Exchange Resins," Rohm and Haas, Apr. 1949, 9 pp. on IRC-50.